United States Patent [19]
Verma et al.

[11] Patent Number: 6,024,892
[45] Date of Patent: Feb. 15, 2000

[54] ANTICORROSION AND PH STABLE ALKALI METAL HALIDE SOLUTIONS FOR AIR DEHUMIDIFICATION

[75] Inventors: Shyam Kumar Verma; George Robert Sandor, both of Gastonia; K. Brian Fitch, Cherryville, all of N.C.

[73] Assignee: FMC Corporation, Philadelphia, Pa.

[21] Appl. No.: 08/944,728

[22] Filed: Oct. 6, 1997

[51] Int. Cl.$^7$ .................................................... C09K 5/00
[52] U.S. Cl. .............................. 252/194; 252/69; 252/68; 252/389.2; 252/389.3; 252/389.4; 252/389.52; 252/389.53; 252/389.54
[58] Field of Search ................................ 252/194, 68, 69, 252/389.2, 389.3, 389.4, 389.52, 389.53, 389.54

[56] References Cited

U.S. PATENT DOCUMENTS

| | | |
|---|---|---|
| 2,725,364 | 11/1955 | Dazzi . |
| 3,227,518 | 1/1966 | Kennedy . |
| 3,424,601 | 1/1969 | Hamilton . |
| 3,643,455 | 2/1972 | Hensel, Jr. et al. . |
| 3,968,045 | 7/1976 | Sibley ........................................ 252/69 |
| 4,019,992 | 4/1977 | Krueger ..................................... 252/68 |
| 4,077,929 | 3/1978 | Robinson . |
| 4,311,024 | 1/1982 | Itoh et al. . |
| 4,455,247 | 6/1984 | Nakayama et al. ........................ 252/69 |
| 4,563,253 | 1/1986 | Leidheiser, Jr. et al. . |
| 4,612,378 | 9/1986 | Bosshard et al. . |
| 4,793,940 | 12/1988 | Borde et al. ............................... 252/69 |
| 4,857,222 | 8/1989 | Itoh et al. ................................. 252/69 |
| 4,963,290 | 10/1990 | Bressan et al. . |
| 5,152,929 | 10/1992 | Bentley et al. . |
| 5,206,404 | 4/1993 | Gunkel et al. . |
| 5,547,600 | 8/1996 | Downey ..................................... 252/68 |
| 5,723,058 | 3/1998 | Schuurman ................................ 252/69 |
| 5,846,450 | 12/1998 | Atkinson .................................... 252/69 |

FOREIGN PATENT DOCUMENTS

| | | |
|---|---|---|
| 0 248 346 | 12/1987 | European Pat. Off. . |
| 0 329 560 | 8/1989 | European Pat. Off. . |
| 0 573 082 | 12/1993 | European Pat. Off. . |
| 0 611 388 | 9/1996 | European Pat. Off. . |
| 0 741 179 | 11/1996 | European Pat. Off. . |
| 2 505 861 | 11/1982 | France . |
| 1-174588 | of 1989 | Japan . |
| 7-138559 | of 1995 | Japan . |

OTHER PUBLICATIONS

Russian Patent Abstract 1685970 (1991).

L.E. Tsygankova et al., Zaschita Metallov 2777: 344–347 (1991) (English Translation).

Tsygankova et al., "Protection of Steel by Hydroxyquinoline Films from Corrosion in Lithium Bromide Solutions," *Protection of Metals*, vol. 27, No. 2, Mar. 1, 1991, pp. 288–291.

JP 01 155 157 A, WPI/Derwent Abstract, Jun. 19, 1989.

(List continued on next page.)

*Primary Examiner*—Jacqueline V. Howard
*Attorney, Agent, or Firm*—Alston & Bird LLP

[57] ABSTRACT

Anticorrosion and pH-stabilized brine solutions useful for air dehumidification processes are disclosed. Inorganic and organic buffering agents or mixtures thereof can be added to halide solutions of alkali metals, alkaline earth metals, or mixtures thereof, to stabilize the pH and/or minimize corrosion of the dehumidifier system. The solution, with or without additional corrosion inhibitors, can offer improved protection as compared to conventionally used inhibitors during repeated dehumidification cycles. In addition, new corrosion inhibitors are disclosed, such as heteropoly anions and phosphonates, which offer improved corrosion protection in closed or open systems during repeated dehumidification cycles or selected applications. These corrosion inhibitors offer improved protection for metals when used with the buffers disclosed herein. The buffered halide solutions, such as lithium chloride, calcium chloride and mixtures thereof, mixed with one or more commonly used corrosion inhibitors also offer improved corrosion protection for metals in closed or open systems.

35 Claims, 2 Drawing Sheets

OTHER PUBLICATIONS

Sastri et al., "Surface Analysis in Corrosion Inhibition Mechanisms," *Werkstoffe Und Korrosion*, vol. 39, No. 2, pp. 77–82, Feb., 1987, West Germany.

Granese et al., "The Inhibition Action of Heterocyclic Nitrogen Organic Compounds on Fe and Steel in HCl Media," *Corrosion Science*, vol. 33, No. 9, pp. 1439–1453, Sep., 1992, UK.

Chemical Abstracts, vol. 126, No. 3, Jan. 20, 1997, Columbus, Ohio, abstract No. 34170, Gorski et al: "Brake Fluid," & PL 166 099 A.

Tanno et al., "The Corrosion of Carbon Steel in Lithium bromide Solution at Moderate Temperatures," *Corrosion Science*, vol. 34, No. 9, pp. 1441–1451, Sept., 1993.

Japanese Patent Abstract 5228327 (1993).

K.Aramaki and H.Nishihara, Fac. Sci. Technol., Keio Univ., Yokohama, 223, Japan 10(7):207–11 (1992).

Japanese Patent Abstract 6221728 (1994).

Japanese Patent Abstract 2296888 (1990).

Japanese Patent Abstract 59117577 (1984).

C. Simpson, "Second Generation Corrosion Inhibitors", *Polymer Paint Colour J.*, 185(4371), pp.23–24 (1995).

Japanese Patent Abstract 59200769 (1984).

L.V. Tumurova, E.V. Kvashnina and M.V. Mokhosoev, Zashch. Met. 26(3), 437–9 (1990) (abstract only).

D.m. Brasher et al., "Sodium *dodeca*–Molybdophosphate as a Corrosion Inhibitor in Aqueous Solution", *Br. Corros. J.*, vol. 4, pp. 74–79, Mar., 1969.

A. Weisstuch et al., "An Electrochemical Study of Heteropoly Molybdates as Cooling Water Corrosion Inhibitors", *Corrosion–Nace*, vol. 28, No. 8, pp.299–306, Aug., 1972.

Patent Abstracts of Japan vol. 007, No. 285 (C–201), Dec. 20, 1983 and JP 58 164792 A (Otsuka Kagaku Yakuhin KK) Sep. 29, 1983.

Pikel'nyi et al; "The Kinetics and Mechanism of Corrosion in the Presence of Heteropolycompounds", Protection of Metals, vol. 30, No. 4, p. 385/386 XP000466629.

Lomakina et al; "Heteropoly Anions as Corrosion Inhibitors for Aluminum in High Temperature Water", *Werkstoffe Und Korrosion*, vol. 46, No. 7, p. R111, 95–1230, XP000517821 (Jul., 1995).

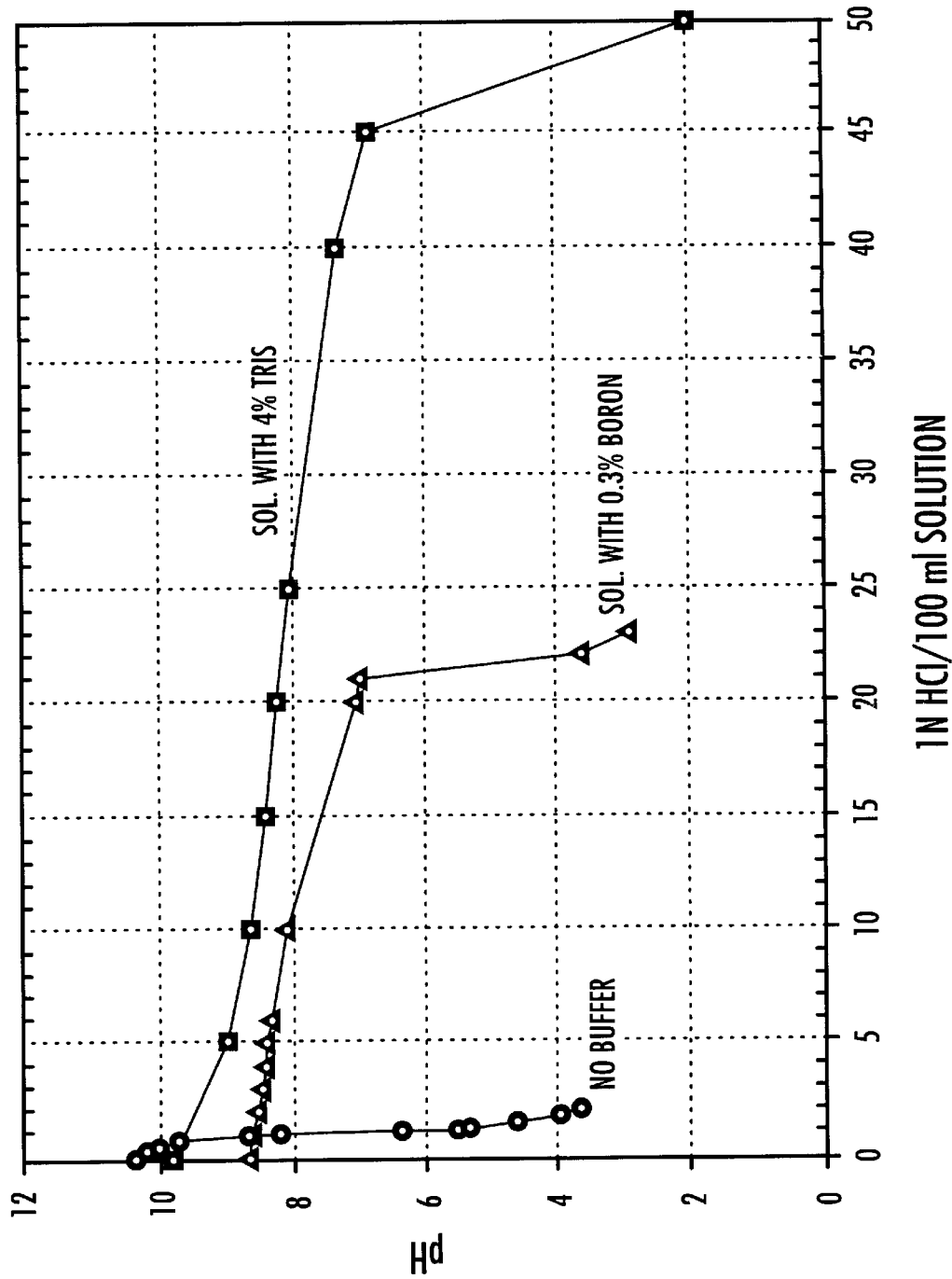

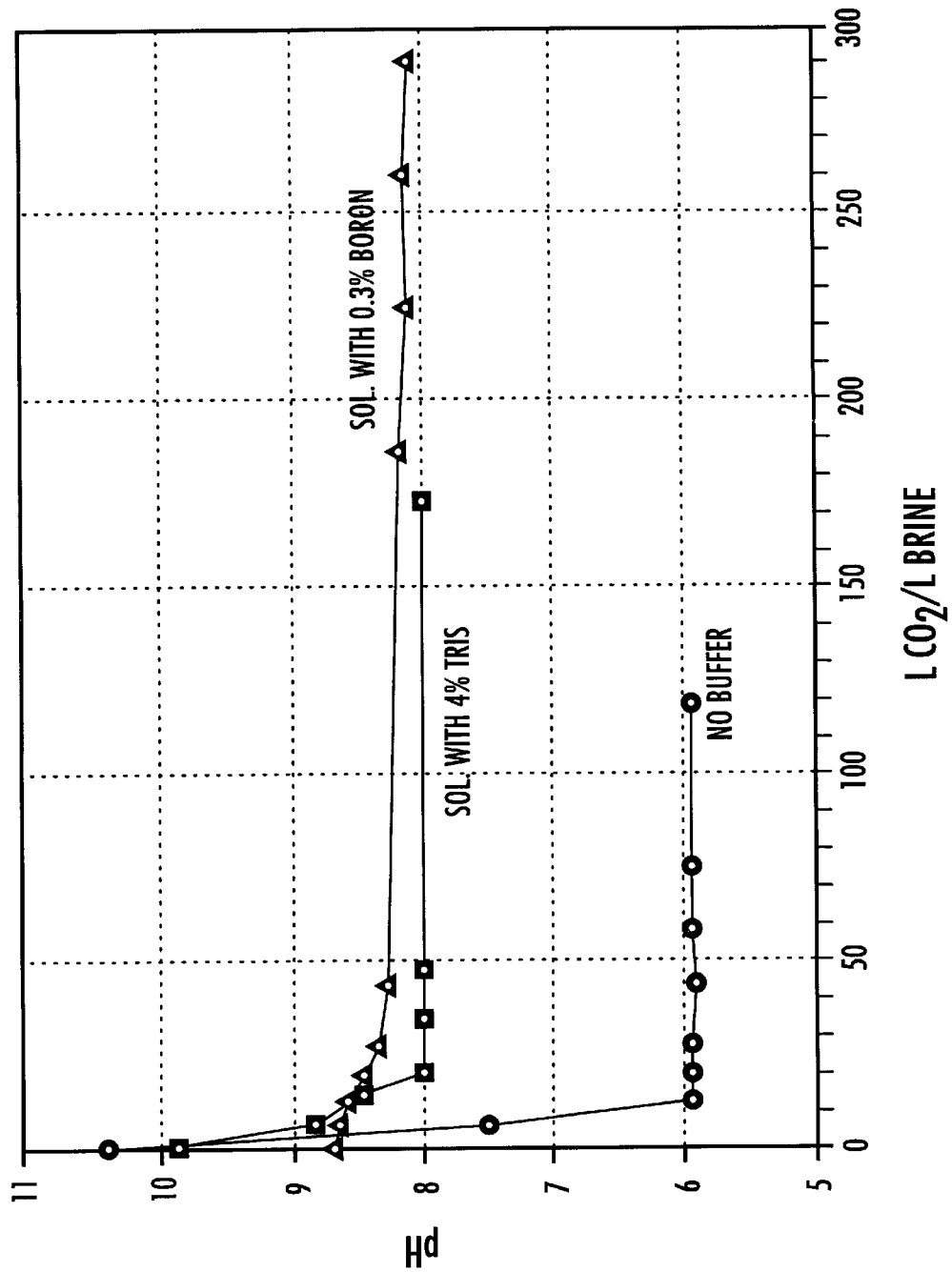

ANTICORROSION AND PH STABLE ALKALI METAL HALIDE SOLUTIONS FOR AIR DEHUMIDIFICATION

FIELD OF THE INVENTION

This invention relates generally to anticorrosion and pH stable solutions for air dehumidification, and in particular to air dehumidification solutions which include an inorganic buffer, organic buffer, or a mixture thereof with one another and/or with a corrosion inhibitor(s).

BACKGROUND OF THE INVENTION

Alkali metal halide solutions and similar solutions, such as calcium chloride solutions, or their mixtures, are widely used in dehumidification processes and systems. In a typical air dehumidification system, humidified air to be conditioned is directed into a cooling system. The humidified air initially enters an air conditioning region where the air is cooled and then contacted with an absorbent solution of alkali metal halide, such as lithium chloride, alkaline earth metal halide, such as calcium chloride, or mixtures thereof. The absorbent solution removes water vapor from humidified stream of air by chemical absorption to provide an air stream with the desired relative humidity. Diluted solution is then routed to a regeneration region where the diluted solution is concentrated and thereafter directed back to the air conditioning region of the system.

Under poor environmental conditions, contaminants, such as carbon dioxide, sulfur oxide compounds ($SO_x$), nitric oxides ($NO_x$) or acidic vapors, can be present in the air stream to be treated. These conditions can adversely affect, that is reduce the pH of the absorbent solution, resulting in an acidic solution. Under acidic conditions, the absorbent solution becomes increasingly corrosive towards the metallic materials of the machine, such as carbon steel which is used to construct dehumidification equipment.

In current practice in the industry, molybdate, chromate or silicate anions or their salts are used as corrosion inhibiting additives. Because the dehumidification systems are open systems, new environmentally friendly and improved corrosion inhibitors are in demand for these systems. Use of chromate is limited due to environmental concerns. While more environmentally acceptable, simple alkali metal molybdate salts have limited stability in aerated solutions. Silicates also exhibit limited stability in this solution.

SUMMARY OF THE INVENTION

The present invention provides pH stable absorbent solutions useful for air dehumidification applications. The absorbent solutions can include inorganic buffers, such as boron-containing buffering agents. The absorbent solutions alternatively can include organic biological buffers, such as amino polyols and/or organic sulfonic acid buffering agents. The absorbent solutions can also include mixtures of the inorganic and/or organic buffering agents. The resultant solutions can exhibit stabilized pH through repeated fluid dehumidification cycles, even for fluid streams contaminated with carbon dioxide, sulfur oxide compounds ($SO_x$), nitric oxides ($NO_x$), acidic vapors, and the like.

The invention also provides pH stable absorbent solutions useful for air dehumidification applications which include new anticorrosion agents. The new anticorrosion additives include phosphonates and heteropoly complexes of transitional elements, preferably, phosphomolybdates. These additives can be used separately or in combination with one another. These additives can also be used with one or more of the above buffering agents. The additives can provide improved pH stability and corrosion inhibition as compared to conventional corrosion inhibiting additives. These buffers and inhibitors are also effective for metal protection from corrosion in closed systems.

BRIEF DESCRIPTION OF THE DRAWING

Some of the features and advantages of the invention having been described, others will become apparent from the detailed description which follows, and from the accompanying drawings, in which:

FIG. 1 is a graph illustrating the buffering effect of inorganic and organic buffering agents present in 40 weight percent lithium chloride (LiCl) brine solutions; and FIG. 2 is a graph illustrating the effect of carbon dioxide ($CO_2$) on the pH of a 25 weight percent lithium chloride solution under ambient conditions with and without an inorganic or organic buffering agent.

DETAILED DESCRIPTION OF THE INVENTION

The boron-containing inorganic buffering agent is selected from boron-containing compounds capable of providing boron ions in the absorbent solution. Exemplary boron-containing inorganic buffering agents include, but are not limited to, lithium tetraborate and metaborate, sodium and potassium borates, boric acid, and the like, and mixtures thereof.

Exemplary amino polyols include, but are not limited to, $C_1$ to $C_3$ linear or branched amino polyols, in which one or more carbon atoms thereof can include $C_1$ to $C_6$ alkyl substituents, which substituents in turn can further include one or more hydroxy and/or amino groups. Exemplary amino polyols include, but are not limited to, amino methyl propane, amino methyl propanol, mixtures thereof and the like.

Exemplary organic sulfonic acid buffering agents include, but are not limited to, compounds of the formula R—$SO_3H$, wherein R can be $C_1$ to $C_{10}$ linear, branched or cyclic alkyl substituents, which substituents can include one or more hydroxyl and/or amino groups and/or $C_5$ to $C_{10}$ heterocyclic rings containing O and/or N atoms. Exemplary organic sulfonic acids include, but are not limited to, amino propane sulfonic acid, the buffers Tris, Bis-tris and Bis-tris propane, commercially available for example from ICN Pharmaceuticals, as well as mixtures thereof and the like.

Mixtures of inorganic and organic buffers as described herein can also be used.

The inorganic and organic buffering agents are added to absorbent solutions which include at least one alkali metal halide, such as lithium chloride, alkaline earth metal halide, such as calcium chloride, or a mixture thereof, in conventional amounts. An exemplary alkali metal halide solution includes alkali metal halide in an amount from about 20 to about 45 weight percent, based on the total weight of the solution.

The inorganic buffering agent can be present in an amount sufficient to provide boron in solution in amounts ranging from about 0.03 to about 1.0 percent by weight, preferably about 0.03 to about 0.3 percent by weight, based on the total weight of the solution. The organic buffering agent can be present in amounts ranging from about 0.7 to about 10.0 percent by weight, preferably about 0.7 to about 4.0 percent by weight, also based on the total weight of the solution.

Such solutions can provide substantial buffering capacity and also provide some corrosion resistance, for example for carbon steel at absorbent solution temperatures of up to about 200° F. under aerated conditions.

The buffering agents can be used with corrosion inhibitors that are commonly used in the industry, such as, but not limited to, alkali metal salts of molybdate, chromate and silicate anions, and mixtures thereof. The buffering agents can also be used with corrosion inhibitors of this invention, such as but not limited to, heteropoly complex anions of transition metal elements, preferably phosphomolybdates, phosphonates, and the like, and mixtures thereof.

The heteropoly complex anions of transition metal elements useful in the invention can be generally described as coordination-type salts and free acids with a complex and high molecular weight anion. The heteropoly complex anions include as a ligand or complexing agent at least one transition metal atom which, as an ion in solution, exhibits corrosion inhibiting properties. The heteropoly complex anions useful in the invention also are preferably substantially completely soluble in alkali metal halide solutions, such as lithium chloride solutions, so as to maximize the concentration of the corrosion inhibiting ions in solution. The heteropoly anions contain complexed transition metal atoms (such as Mo). Therefore, the dissolved heteropoly anions can provide a higher level of transition metal anion (Mo anion) in a solution, as compared to simple transition metal oxides, such as molybdates like lithium molybdate.

Such complexes can be generally represented by the following formulas:

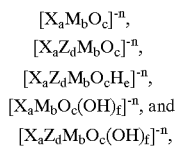

wherein:
X and Z are central heteroatoms from Groups I–VIII of the Periodic Table of Elements;
the value of a varies and is 1 or 2;
the value of d varies and is an integer from 0 to 4;
$M_bO_c$, $M_bO_cH_e$, and $M_bO_c(OH)_f$ are oxoanions in which M is a transition metal element; the value of b varies, depending upon the number of transition metal atoms present in the oxoanion and can be an integer from 5 to 22, preferably 6 to 12; the value of c varies, depending upon the number of oxygen atoms present in the oxoanion attached to the transition metal and also capable of forming unique structural groups with the central atoms, and is an integer from 20 to 70, preferably from 24 to 40; the value of e varies (for example in the reduced heteropolyanion, the value of e varies depending upon the reduction of the heteropolyanion) and is an integer from 0 to 6; and the value of f varies and is an integer from 0 to 3; and
n is the charge of the anion and is the sum of the charges on X, Z, M, O, H, and OH.

Although the above formulas are general representations of the heteropoly complex anions useful in the invention, as will be appreciated by the skilled artisan, other compounds can also be included. Also as these formulas represent, in some heteropoly complex anions, H atoms in addition to the O atoms have been reported. Any of the various heteropoly complex anions known in the art can be used in the invention, including compounds described by G. A. Tsigdinos, Topics Curr. Chem., vol. 76, 5–64 (1978) and D. L. Kepert, Comprehensive Inorganic Chemistry (A. F. Trofman et al.) Oxford:Pergamon Press, vol. 4, pp. 607 (1973), the entire disclosure of each of which is incorporated herein by reference.

With regard to the central or heteroatom X, over 40 different elements (both metals and nonmetals) from Periodic Groups I–VIII can function as central atoms in distinct heteropoly complex anions. Exemplary central atoms include, but are not limited to, ions of phosphorus, silicon, manganese, arsenic, boron, iron, tellurium, copper, zinc, aluminum, tin, zirconium, titanium, vanadium, antimony, bismuth and chromium, and the like.

M is a 2–18 hexavalent transition metal element atom, which surrounds one or more central atoms X. The transition metal atom M is selected from those elements which as ions in solution provide corrosion inhibiting effect in absorption refrigeration systems. Preferably the transition metal element M in the oxoanion is derived from molybdate or tungstate. Other transition metal elements can also be present, as represented in the formula as Z, such as but not limited to, manganese, cobalt, nickel, copper, zinc, vanadium, niobium, tantalum and other transition elements.

Exemplary heteropoly complex anions include, but are not limited to, phosphomolybdates, such as but not limited to, $[PMo_{12}O_{40}]^{-3}$, wherein $P^{+5}$ is the central atom or heteroatom, $[PMo_{10}V_2O_{40}]^{-5}$ and the like; silicon molybdates, such as but not limited to, $[SiMo_{11}NiO_{40}H_2])^{-6}$, wherein $Si^{+4}$ is the central atom; manganese molybdates, such as but not limited to, $[MnMo_9O_{32}]^{-6}$, wherein $Mn^{+4}$ is the central atom; silicon tungstates, such as but not limited to, $[SiW_{12}O_{40}]^{-4}$, wherein $Si^{+4}$ is the central atom; tellurium molybdates, such as but not limited to, $[TeMo_6O_{24}]^{-6}$, wherein $Te^{+6}$ is the central atom; arsenic molybdates, such as but not limited to, $[As_2Mo_{18}O_{62}]^{-6}$, wherein $As^{+5}$ is the central atom; manganese niobiates, such as but not limited to, $[MnNb12O_{36}]^{-12}$, wherein $Mn^{+4}$ is the central atom; and the like, and mixtures thereof. Currently preferred heteropoly complex anions are phosphomolybdates.

The heteropoly complex anions which have been structurally characterized can be divided into the broad groups, depending upon the heteroatom [X], transition metal atom [M] stoichiometry, and upon the coordination number of the heteroatom (that is, the number of points at which M is attached to the heteroatom in the complex). The heteropoly complex anions can be classified according to the ratio of the number of the central atoms to the peripheral molybdenum or other such atoms. For example, the different types of known heteropoly complex anions of molybdate show the following X:M ratio with one or more central atoms: X:M= 1:12, 1:11, 1:10, 1:9, 1:6, 2:10, 2:17, 2:5, 4:12, 1 m:6 m (m unknown) and 1:1 heteropoly complex anions. The known tungstates include all of the above in addition to 2:18, 2:17 and 2:4:18.

Such complexes can be present in an amount from about 0.02 to about 0.3 percent by weight, preferably about 0.05 to about 0.2 percent by weight, based on the total weight of the solution.

Exemplary phosphonates include, but are not limited to, 2-hydroxy-phosphonoacetic acid (HPA), tris-amino phosphonic acid (AMP), 1,1-hydroxyethylidine diphosphonic acid (HEDP), ethylene diamine tetra-methylenephosphonic acid (ENTP), hexamethylene diamine tetra-methylenephosphonic acid (HMTP), diethylene triamine penta-methylenephosphonic acid, and the like. The phosphonates are well known in the art and are described in U.S.

Pat. Nos. 3,214,454; 3,278,446; 3,336,221; and 4,026,815, the entire disclosure of each of which is hereby incorporated by reference. The phosphonates can be present in an amount from about 0.005 to about 0.05 percent by weight, preferably about 0.005 to about 0.03 percent by weight, based on the total weight of the solution.

In another embodiment of the invention, solutions for air dehumidification applications are provided which include new anticorrosion additives phosphonates and/or heteropoly complexes of transitional elements, or mixtures thereof with one another or with conventional inhibitors, as described above. These solutions and mixtures of alkali salts of molybdate, chromates and silicate can exhibit improved corrosion inhibition as compared to conventional solutions with molybdate, chromate or silicate anions.

The present invention will be further illustrated by the following non-limiting examples.

EXAMPLE 1

An organic buffer (4 weight percent Tris) and inorganic buffer (lithium tetraborate as 0.3 weight percent boron, designated as B) were added to 40 weight percent lithium chloride (LiCl) solutions, and the solutions were evaluated for pH stability as follows: (1) by titration of 100 ml solution with 1 N hydrochloric acid; and (2) by treating 100 ml solution with carbon dioxide gas flowing at a rate of 20 ml/minute through the solution under ambient conditions. The results of the tests are presented in FIGS. 1 and 2. As demonstrated by the Figures, the buffered solutions were found to have stabilized pH.

EXAMPLE 2

Solutions with an organic buffer (4 weight percent Tris) and inorganic buffer (0.3 weight percent B) were also evaluated for corrosion resistance. Carbon steel coupons galvanically coupled to titanium were kept in 800 ml of a 25% lithium chloride solution for 30 days. The solution temperature was maintained at 150° F. and the solution was constantly aerated by bubbling air through the solution. The corrosion test results are set forth in Table 1.

TABLE 1

Corrosion Rates of Carbon-Steel in 25 wt. % LiCl Absorption Solutions

| LiCl Solution | pH Initial | pH After 30 days* | Corrosion Rate (mils per year, mpy)** |
|---|---|---|---|
| no buffer | 9.8 | 7.1 | 12.9 |
| 0.3 wt. % B | 9.5 | 8.7 | 3.2 |
| 2 wt. % Tris | 9.9 | 9.5 | 5.2 |

*solution after Corrosion Test
**in 30 days

As indicated in Table 1, the corrosion rate of carbon steel was reduced from 12.9 mils per year (mpy) to 3.2 to 5.2 mpy for the solution with 3000 ppm boron buffer or 2% of propane-based buffer, respectively, and solution pH remained stable during the test.

EXAMPLE 3

Corrosion tests were also run on carbon steel coupons with lithium chloride solutions containing $Li_2MoO_4$ as a corrosion inhibiting agent, with and without buffer. Corrosion tests were also run on lithium chloride solutions which included a phosphonate commercially available as Belcor from FMC (with and without buffer) and lithium chloride solutions with $Li_2MoO_4$, phosphomolybdate (PMA) without buffer and PMA with buffer. The tests resulted generally in lower corrosion rates for the combination of the corrosion inhibiting agents with buffer than that observed in the presence of lithium chloride or lithium molybdate solutions with no additive. These additives provide additional protection for metal against the corrosive attack of the brine solution. The results are set forth below in Tables 2, 3, and 4 below.

TABLE 2

Corrosion Rate of Carbon Steel in
25 wt. % LiCl Solution Containing $Li_2MoO_4$ (250 ppm)
(100° F., Aerated, Ambient Pressure)

| Buffer Additive | Corrosion Rate (mils per year)* |
|---|---|
| None | 5.2 |
| Buffered (B + Tris**) | 2.6 |

*in 30 days
**B = 0.2 percent; Tris = 1 percent

TABLE 3

Corrosion Rate of Carbon Steel in
25 wt. % LiCl Solution
(100° F., Aerated, Ambient Pressure)

| Additive | Corrosion Rate (mils per year)* |
|---|---|
| None | 6.0 |
| Belcor** (200 ppm) | 0.6 |
| Belcor (200 ppm) and Buffer (B + Tris***) | 1.1 |

*in 30 days
**phosphonate commercially available from FMC
***B = 0.2 percent; Tris = 1 percent

TABLE 4

Corrosion Rate of Carbon Steel in
25 wt. % LiCl Solution
(100° F., Aerated, Ambient Pressure)

| Additive | Corrosion Rate (mils per year)* |
|---|---|
| None | 6.0 |
| $Li_2MoO_4$ (250 ppm) | 5.2 |
| PMA** (1009 ppm) | 4.5 |
| PMA (996 ppm) and Buffer (B + Tris***) | 3.9 |

*in 30 days
**phosphomolybdate
***B = 0.2 percent; Tris = 1 percent

The foregoing examples are illustrative of the present invention and are not to be construed as limiting thereof.

That which is claimed is:

1. An absorbent solution for closed or open systems for dehumidifying humidified fluid streams and other related systems, comprising at least one halide of an alkali metal, an alkaline earth metal, or a mixture thereof in an amount from about 20 to about 45 weight percent based on the total weight of the solution, and at least one inorganic or organic buffering agent or a mixture thereof.

2. The solution of claim 1, wherein said at least one inorganic or organic buffering agent or a mixture thereof is capable of stabilizing the pH of said solution during repeated dehumidification cycles.

3. The solution of claim 1, wherein said inorganic buffering agent is a boron-containing buffering agent.

4. The solution of claim 3, wherein said boron-containing buffering agent is selected from the group consisting of lithium tetraborate compounds, lithium metaborate, sodium borate, potassium borate, boric acid, and mixtures thereof.

5. The solution of claim 4, wherein said boron-containing buffering agent is a lithium tetraborate compound.

6. The solution of claim 1, wherein said organic buffering agent is selected from the group consisting of amino polyols, organic sulfonic acids, and mixtures thereof.

7. The solution of claim 6, wherein said organic buffering agent is selected from the group consisting of amino methyl propane, amino propane sulfonic acid, amino methyl propanol, Tris-, Bis-Tris, Bis-Tris propane and mixtures thereof.

8. The solution of claim 7, wherein said organic buffering agent is selected from the group consisting of Tris, Bis-Tris, Bis-Tris propane, and mixtures thereof.

9. The solution of claim 1, further comprising at least one corrosion inhibitor comprising a heteropoly complex of a transitional element.

10. The solution of claim 1, further comprising at least one corrosion inhibitor selected from the group consisting of alkali metal salts of molybdate, chromate anions, silicate anions, and mixtures thereof.

11. The solution of claim 1, wherein said solution comprises inorganic buffering agent in an amount from about 0.03 to about 1.0 percent by weight based on the total weight of the solution.

12. The solution of claim 11, wherein said solution comprises inorganic buffering agent in an amount from about 0.03 to about 0.3 percent by weight based on the total weight of the solution.

13. The solution of claim 1, wherein said solution comprises organic buffering agent in an amount from about 0.7 to about 10.0 percent by weight based on the total weight of the solution.

14. The solution of claim 13, wherein said solution comprises organic buffering agent in an amount from about 0.7 to about 4 percent by weight based on the total weight of the solution.

15. The solution of claim 9, wherein said solution comprises heteropoly complex in an amount from about 0.02 to about 0.3 percent by weight based on the total weight of the solution for corrosion reduction.

16. An absorbent solution for dehumidifying humidified fluid streams, comprising at least one halide of an alkali metal, an alkaline earth metal, or a mixture thereof in an amount from about 20 to about 45 weight percent based on the total weight of the solution, and at least one corrosion inhibitor comprising a heteropoly complex of a transitional element capable of providing a corrosion inhibiting effect.

17. The solution of claim 16, wherein said at least one halide of an alkali metal, an alkaline earth metal, or mixture thereof comprises lithium chloride.

18. The solution of claim 16, wherein said solution further comprises at least one inorganic or organic buffering agent or a mixture thereof capable of stabilizing the pH of said solution during repeated dehumidification cycles.

19. An absorbent solution for dehumidifying humidified fluid streams, comprising at least one halide of an alkali metal, an alkaline earth metal, or a mixture thereof in an amount from about 20 to about 45 weight percent based on the total weight of the solution, at least one corrosion inhibitor comprising a heteropoly complex of a transitional element capable of providing an improved corrosion inhibiting effect, and at least one inorganic or organic buffering agent or a mixture thereof capable of stabilizing the pH of said solution during repeated dehumidification cycles.

20. An absorbent solution for dehumidifying humidified fluid streams, comprising at least one halide of an alkali metal, an alkaline earth metal, or a mixture thereof in an amount from about 20 to about 45 weight percent based on the total weight of the solution, at least one corrosion inhibitor selected from the group consisting of alkali metal salts of molybdate, chromate anions, silicate anions, and mixtures thereof, at least one additional corrosion inhibiting agent comprising a heteropoly complex of a transitional element, and at least one inorganic or organic buffering agent or a mixture thereof capable of stabilizing the pH of said solution during repeated dehumidification cycles.

21. A process for dehumidifying humidified fluid streams, comprising circulating in a dehumidification machine a solution for dehumidifying humidified fluid streams comprising at least one halide of an alkali metal, an alkaline earth metal, or a mixture thereof, and at least one inorganic or organic buffering agent or a mixture thereof capable of stabilizing the pH of said solution during repeated dehumidification cycles.

22. The process of claim 21, wherein said solution further comprises at least one corrosion inhibiting agent.

23. The process of claim 22, wherein said at least one corrosion inhibiting agent is selected from the group consisting of heteropoly complexes of transitional elements, phosphonates, and mixtures thereof.

24. The process of claim 22, wherein said at least one corrosion inhibiting agent is selected from the group consisting of alkali metal salts of molybdate, chromate anions, silicate anions, and mixtures thereof.

25. An absorbent solution for closed or open systems for dehumidifying humidified fluid streams and other related systems, comprising at least one halide of an alkali metal, an alkaline earth metal, or a mixture thereof in an amount from about 20 to about 45 weight percent based on the total weight of the solution, and lithium tetraborate as an inorganic buffering agent.

26. The solution of claim 1, wherein said solution is an aerated solution.

27. The solution of claim 2, wherein said at least one inorganic or organic buffering agent is capable of stabilizing the pH of said solution from about 7 to about 9.5.

28. The solution of claim 9, wherein said heteropoly complex comprises a compound selected from the group consisting of $[X_aM_bO_c]^{-n}$, $[X_aZ_dM_bO_c]^{-n}$, $[X_aZ_dM_bO_cH_e]^{-n}$, $[X_aM_bO_c(OH)_f]^{-n}$, $[X_aZ_dM_bO_c(OH)_f]^{-n}$, and mixtures thereof, wherein:

X and Z are central heteroatoms selected from the group consisting of elements of Groups IVB, VB, VIB, VIIB, VIII, IB, IIB, IIIA, IVA, and VA;

a is 1 or 2;

d is an integer from 0 to 4;

$M_bO_c$, $M_bO_cH_e$, and $M_bO_c(OH)_f$ are oxoanions in which M is a transition metal element selected from the group consisting of molybdenum and tungsten; b is an integer from 5 to 22; c is an integer from 20 to 70; e is an integer from 0 to 6; and f is an integer from 0 to 3; and n is the charge of the anion.

29. The solution of claim 28, wherein:

X is a central heteroatom selected from the group consisting of phosphorus, silicon, manganese, arsenic, boron, iron, tellurium, copper, zinc, aluminum, tin, zirconium, titanium, vanadium, antimony, bismuth, and chromium; and Z is a central heteroatom selected from the group consisting of manganese, cobalt, nickel, copper, zinc, vanadium, niobium, and tantalum.

30. The solution of claim 16, wherein said heteropoly complex comprises a compound selected from the group consisting of $[X_aM_bO_c]^{-n}$, $[X_aZ_dM_bO_c]^{-n}$, $[X_aZ_dM_bO_cH_e]^{-n}$, $[X_aM_bO_c(OH)_f]^{-n}$, $[X_aZ_dM_bO_c(OH)_f]^{-n}$, and mixtures thereof, wherein:

- X and Z are central heteroatoms selected from the group consisting of elements of Groups IVB, VB, VIB, VIIB, VIII, IB, IIB, IIIA, IVA, and VA;
- a is 1 or 2;
- d is an integer from 0 to 4;
- $M_bO_c$, $M_bO_cH_e$, and $M_bO_c(OH)_f$ are oxoanions in which M is a transition metal element selected from the group consisting of molybdenum and tungsten; b is an integer from 5 to 22; c is an integer from 20 to 70; e is an integer from 0 to 6; and f is an integer from 0 to 3; and
- n is the charge of the anion.

31. The solution of claim 30, wherein:

- X is a central heteroatom selected from the group consisting of phosphorus, silicon, manganese, arsenic, boron, iron, tellurium, copper, zinc, aluminum, tin, zirconium, titanium, vanadium, antimony, bismuth, and chromium; and
- Z is a central heteroatom selected from the group consisting of manganese, cobalt, nickel, copper, zinc, vanadium, niobium, and tantalum.

32. The solution of claim 19, wherein said heteropoly complex comprises a compound selected from the group consisting of $[X_aM_bO_c]^{-n}$, $[X_aZ_dM_bO_c]^{-n}$, $[X_aZ_dM_bO_cH_e]^{-n}$, $[X_aM_bO_c(OH)_f]^{-n}$, $[X_aZ_dM_bO_c(OH)_f]^{-n}$, and mixtures thereof, wherein:

- X and Z are central heteroatoms selected from the group consisting of elements of Groups IVB, VB, VIB, VIIB, VIII, IB, IIB, IIIA, IVA, and VA;
- a is 1 or 2;
- d is an integer from 0 to 4;
- $M_bO_c$, $M_bO_cH_e$, and $M_bO_c(OH)_f$ are oxoanions in which M is a transition metal element selected from the group consisting of molybdenum and tungsten; b is an integer from 5 to 22; c is an integer from 20 to 70; e is an integer from 0 to 6; and f is an integer from 0 to 3; and
- n is the charge of the anion.

33. The solution of claim 32, wherein:

- X is a central heteroatom selected from the group consisting of phosphorus, silicon, manganese, arsenic, boron, iron, tellurium, copper, zinc, aluminum, tin, zirconium, titanium, vanadium, antimony, bismuth, and chromium; and
- Z is a central heteroatom selected from the group consisting of manganese, cobalt, nickel, copper, zinc, vanadium, niobium, and tantalum.

34. The solution of claim 16, wherein said solution is an aerated solution.

35. The solution of claim 16, wherein said at least one inorganic or organic buffering agent is capable of stabilizing the pH of said solution from about 7 to about 9.5.

* * * * *

UNITED STATES PATENT AND TRADEMARK OFFICE
CERTIFICATE OF CORRECTION

PATENT NO. : 6,024,892
DATED : February 15, 2000
INVENTOR(S) : Verma et al.

It is certified that error appears in the above-identified patent and that said Letters Patent is hereby corrected as shown below:

Title page, [56] References Cited, OTHER PUBLICATIONS, page 2, column 2, line 4, "D.m. Brasher et al." should read --D.M. Brasher et al.--.

Column 8, line 51, "or2" should read --or 2--.

Column 9, line 9, "or2" should read --or 2--.

Column 10, line 4, "or2" should read --or 2--; line 25, "claim 16" should read --claim 19--; line 27, "claim 16" should read --claim 19--.

Signed and Sealed this

Twenty-first Day of November, 2000

*Attest:*

Q. TODD DICKINSON

*Attesting Officer*     *Director of Patents and Trademarks*